Dec. 24, 1957     C. A. TUDBURY ET AL     2,817,793
SURGE PROTECTOR FOR ALTERNATING-CURRENT POWER APPARATUS
Filed July 26, 1954
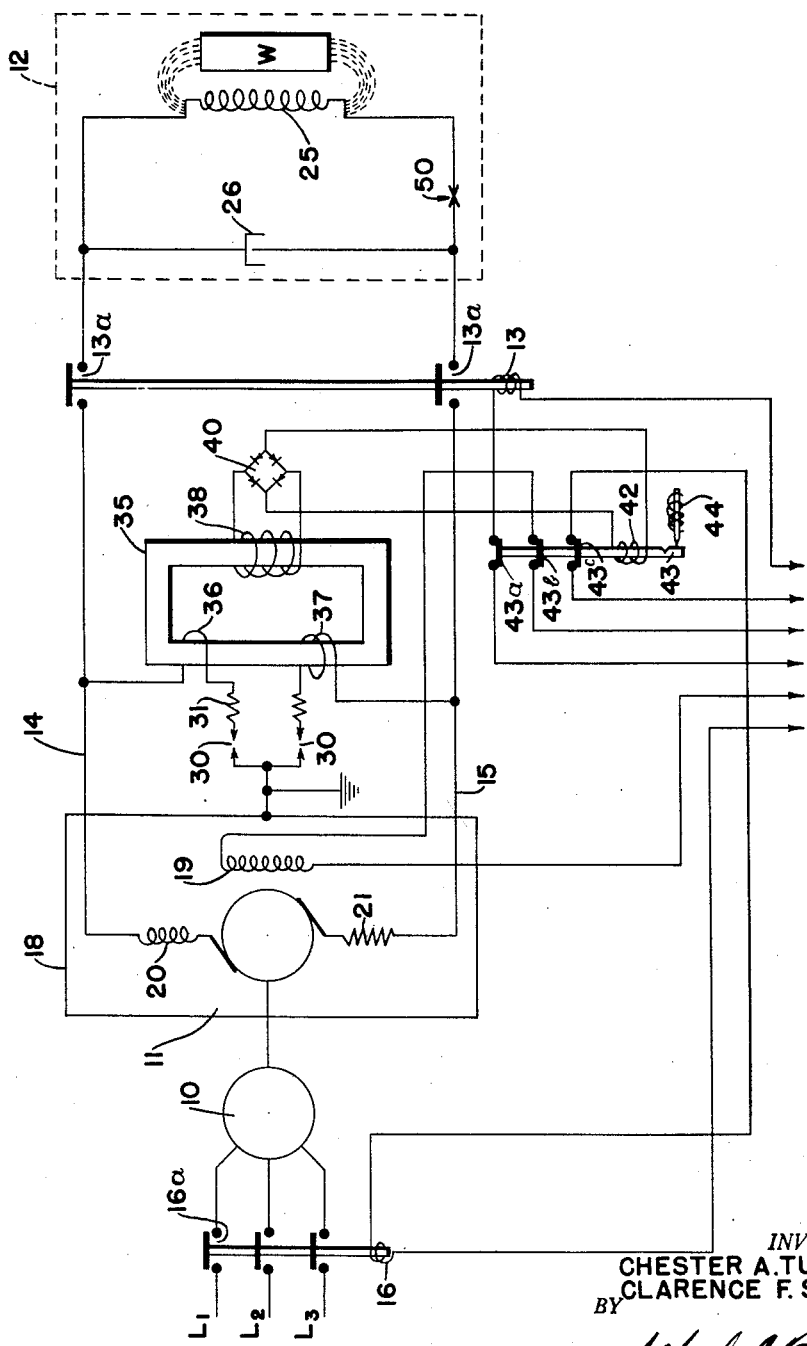
INVENTORS
CHESTER A. TUDBURY &
CLARENCE F. SCHWAN
BY
ATTORNEY

United States Patent Office 2,817,793
Patented Dec. 24, 1957

2,817,793

SURGE PROTECTOR FOR ALTERNATING-CURRENT POWER APPARATUS

Chester A. Tudbury and Clarence F. Schwan, Cleveland, Ohio, assignors to The Ohio Crankshaft Company, Cleveland, Ohio, a corporation of Ohio Application July 26, 1954, Serial No. 445,738

4 Claims. (Cl. 317—13)

This invention pertains to the art of protective apparatus for alternating-current power systems and, more particularly, to protective apparatus for high-power, alternating-current power sources wherein inductances and capacitances are connected in the load circuit thereof.

The invention is particularly applicable to high-frequency induction heating or ultrasonic apparatus and will be described with particular reference thereto, although it will be appreciated that the invention has broader applications.

In the induction heating and ultrasonic art, high-frequency alternators are ordinarily employed as the high-frequency power source, particularly when large amounts of electrical power; that is to say, in excess of 20 kilowatts, are required. The load circuits on these alternators normally consist of an inducing coil which is inductive and electrical condensers in parallel therewith.

The high-frequency alternators normally employed have an internal inductance which, under certain conditions of loading, can develop sufficiently high voltages across the output terminals of the alternator or between the terminals of the alternator and the frame to severely damage the electrical insulation in the alternator.

Thus, if the inducing coil should be connected to the alternator when no workpiece is positioned in the coil, the voltages may possibly rise to abnormally high values.

The situation is particularly bad if the load circuit is connected to the alternator when the inducing coil is disconnected or has an open turn or if the conductor of the inducing coil should break when under load. Here, the condensers which are still in this load circuit may form a resonant or near resonant condition with the internal inductance of the alternator at the output frequency thereof. As is known, alternating current circuits containing both inductance and capacity resonant to or near resonant to the frequency of the alternating current can have extremely high alternating-current voltages developed in the circuit components. These voltages can be many times that of the output voltage of the alternator.

For example, tests and calculations have shown that an ordinary 10,000-cycle, 300-kilowatt, high-frequency alternator having a normal output voltage rating of 800 volts at 375 amperes can have voltages on the order of 33,000 volts and currents on the order of 13,300 amperes built up therein within several microseconds after one of the turns of the coil accidentally ruptures. Such voltages and currents will almost instantaneously break down the insulation either of the condensers in the load circuit or of the high-frequency alternator, or both. Extensive and expensive repairs are then required.

Various types of means for preventing this build-up of voltage have in the past been proposed, no one of which has, to our knowledge, proven satisfactory in the above referred to type of apparatus.

Thus, for example, it has heretofore been proposed to place a "Thyrite" resistor across the output terminals of the generator. Such resistors have a negative coefficient of resistance; that is to say, as the voltage thereacross goes up, the resistance goes down. Investigation has indicated, however, that "Thyrite" resistances of a value and power-handling capability to care for generators of the type and power ratings referred to would fill a compartment of a size almost equal to that of the alternator. Furthermore, once such "Thyrite" resistors have acted to prevent the build-up of these high voltages, it is never known whether or not they may have been severely damaged and are still able to function if subsequent resonant conditions should occur.

It has further heretofore been proposed to provide relays in series with the load circuit consisting of the coil and its condensers which will disconnect these condensers whenever the currents and voltages in the circuit exceed a certain predetermined value. However, relays of the type required to handle the high powers involved in induction heating and ultrasonic work require at least one-tenth second to open. This is entirely too long. The alternator and condensers will have been severely damaged before the relay has even commenced to operate.

Another problem hinted at above is that the equipment for preventing the overload must act quickly and be sufficiently sensitive to operate at relatively low currents and still not be damaged by excessively high currents which might result before the overload can be removed.

By overload is meant some condition which if continued for any appreciable period of time will severely damage the alternator. Excessive voltages may be considered an overload even though the load circuit itself is disconnected from the alternator.

The present invention contemplates improved means to be used in conjunction with an alternating current power source having an inherent internal inductance and a load having both inductance and capacitance which overcomes all of the above difficulties and others and enables the removal of an overload caused by resonant or near resonant conditions before such overload conditions can cause damage to the apparatus.

In accordance with the invention, voltage sensitive means are connected directly from each output terminal of the power source to the frame of the power source which will provide a short circuit or extremely low resistance electrical path to the frame whenever the voltage between either terminal and the frame exceeds a predetermined value. Such means, in accordance with the invention, must be of the instantaneous acting type. Spark gaps adjusted to break down at a predetermined voltage, electronic tubes adjusted to break down at a predetermined voltage or the like may be employed. Such means are capable of acting within the time required for the gases in the electrical path to ionize. Normally, this is on the order of 25 microseconds or less. Thus, before the high resonant voltages can build up to a damaging value, the voltage-sensitive means will have acted to provide a short circuit to reduce or limit the voltages developed to safe values for the apparatus.

Further, in accordance with the invention, current-sensitive means are provided in series with the voltage-sensitive means which will be actuated by currents flowing in the voltage-sensitive means to set up a series of steps to either de-energize the motor driving the alternating-current power source, disconnect the condensers from the alternator or de-energize the exciting field of the alternator or a combination of both. Such current-sensitive means, in accordance with the invention, have a nonlinear output; that is to say, an output which does not increase proportionately with increases in current and which, preferably, has an output which reaches a maximum at relatively low values of current. Iron cored current transformers having a core which will saturate with magnetic flux at relatively low current values have been found satisfactory. The output of such current transformers can be connected to control apparatus which will de-energize the alternator or turn it off or disconnect the load circuit from the alternator or a combination of all three as desired.

The principal object of the invention is the provision of a new and improved apparatus for preventing the build up of large voltages between the terminals and the frame of a high-frequency alternator.

Another object of the invention is the provision of a new and improved means for shorting the terminals of the high-frequency alternator to the frame thereof whenever voltages above a predetermined amount become present.

Still another object of the invention is the provision of a new and improved means for preventing damaging voltages to develop in the high-frequency alternating-current power source due to a resonant condition with means on the output or load circuit.

Still another object of the invention is the provision and combination of a high-frequency alternator having output terminals, voltage-sensitive means actuated at predetermined voltages in series from the output terminals to the frame of the alternator and current transformers in series with each voltage-sensitive means actuatable to de-energize the alternator upon overloads occurring.

Still another object of the invention is the provision of a new and improved arrangement for preventing damaging overloads on a high-frequency alternator comprising means which break down at predetermined voltages in series from each output terminal of the alternator to the frame thereof and means sensitive to low currents but not damaged by high current in series with each spark gap actuable to de-energize the alternator.

Still another object of the invention is the provision of a new and improved means for de-energizing a high-frequency alternator when overloads occur thereon comprising spark gaps connected in series from each terminal of the alternator to the frame and a single-current transformer coupled in series with each spark gap, the arrangement of the current transformer being such that it has unequal coupling with each spark gap circuit whereby the electrical connections thereto are unimportant.

The invention may be comprised in certain parts and arrangements of parts, a preferred embodiment of which will be described in detail in this specification and illustrated in the accompanying drawing which is a part hereof, and wherein:

The single figure shows a schematic wiring diagram of a high-frequency induction-heating circuit embodying the present invention.

Referring now to the drawing wherein the showings are for the purposes of illustrating a preferred embodiment of the invention only and not for the purposes of limiting the invention, there is shown a motor 10, a high-frequency alternator 11 mechanically coupled to the motor 10 and a load circuit 12 electrically connected to the output terminals of the alternator 11 through a normally open contact 13a of a relay 13 by suitable bus bars or power leads 14, 15.

The motor 10 is shown as a conventional three-phase, alternating-current induction motor connected to the power lines $L_1$, $L_2$ and $L_3$ through the normally open contacts 16a of a relay 16. Obviously, the motor 10 could be any known type of prime mover or could be a single-phase, alternating-current motor.

The high-frequency alternator 11 includes generally a frame 18 and a field coil 19 and an armature or output winding indicated as having an inductance 20 and a resistance 21 in series with the output of the alternator 11. Actually, the inductance 20 and the resistance 21 will be distributed over the entire winding and are shown as lumped impedances in the diagram for the purposes of convenience and as is conventional in the art. The output voltage of the alternator 11; that is, the voltage across the wires 14 and 15, will be as is conventional in the art, determined by the characteristics of the alternator 11 and the strength of energizing of the field coils 19.

The load circuit 12 is comprised generally of an inducting coil 25 inductively coupled with a workpiece W with the terminals of the coils 25 connected to the power leads 14, 15 substantially as is shown. Additionally, a capacitor 26 is connected in parallel with the work coil 25 having a capacitive reactance generally equal to the inductive reactance of the coil 25 with the work W magnetically coupled thereto.

The purpose of the condenser 26 is to correct for the normally highly inductive load which the coil 25 would impose on the alternator 11 so that a power factor of the load circuit 12 on the alternator will be approximately unity.

What has been described so far is relatively conventional in the art. Basically, the problem which has existed with such circuits and which the present invention attempts to overcome is that condition which might arise if the workpiece W were not magnetically coupled with the coil 25 or if the power lead to the coil 25 were broken for one reason or another. Particularly, in the latter case, it will be appreciated that the condenser 26 will be in series with the inductance 20 of the alternator output winding. As pointed out heretofore, if the capacitive reactance of the capacitors is at all close to or equal to the inductive reactance of the inductance 20 at the output frequency, a resonant condition will result wherein extremely high voltages can be developed both across the capacitors and across the output winding 20. In particular, it is quite possible to have extremely high voltages developed almost instantaneously throughout the system and, in particular, from one output terminal of the alternator 11 to the frame 18 thereof with the result that the electrical insulation of the alternator will break down, thus necessitating extensive repairs to the alternator. Further, the high voltages on the system are dangerous to personnel nearby.

In accordance with the invention, a spark cap 30 is connected from each terminal of the alternator 11 to the frame thereof. This spark gap 30 is so adjusted as to break down at a voltage in excess of the normal output voltage of the alternator 11 but at a voltage less than that which the insulation of the alternator 11 can withstand for brief periods of time. For a 600 volt alternator, a break-down voltage of from 1,000 to 1,300 volts to ground has been found to be satisfactory. It will be noted that two spark gaps 30 are provided, one from each terminal of the alternator 11 to the frame 18 thereof.

Additionally, the preferred embodiment of the invention includes a resistor 31 in electrical series with the spark gaps 30. The resistor 31 is preferably of the "Thyrite" type. In some cases, it is possible to eliminate the "Thyrite" resistor 31. However, it has been found that by providing it, some limiting of the maximum short-circuit current does result and, in addition, the use of the resistor 31 assists in helping to extinguish the spark across the gap 30 after the alternator 11 has been de-energized as will be presently apparent.

A current transformer 35 of the iron-core type is provided having a primary 36 in series with the upper spark gap 30 and a primary 37 in series with the lower spark gap. In addition, the current transformer includes a secondary winding 38, the output terminals of which connect to the A. C. input terminals of a full-wave alternating-current rectifier 40. The output terminals of the rectifier 40 connect to the actuating coil 42 of a latching-type relay 43. The latching mechanism may be as desired and is shown schematically at 44. The relay 43 has three normally closed contacts 43a, 43b and 43c connected in electrical series with the actuating coil for the relay 13, the field coil 19 and the actuating coil for the relay 16 respectively. When the relay 43 is actuated, the normally closed contacts 43a, 43b, and 43c thereof will open and remain open due to the latching mechanism 44. Obviously, when these contacts are open, it will be impossible to energize the motor 10, the field coil 19 or to connect the load circuit 12 to the alternator. Obviously, any two of these functions may be omitted if desired or additional functions may be added.

If it be assumed that the coil 25 should either be disconnected from the load circuit 12 or that one of its power leads should break as at 50, as pointed out above and further assumed that the condenser 26 forms a resonant circuit with the inductance 20. If such resonant condition exists, the voltages across the inductance 20 will rise rapidly and a high voltage potential will develop between at least one of the terminals of the alternator 11 and its frame. When the voltage exceeds the break-down voltage of the gap 30, an arc will immediately develop thereacross. The gap with the arc thereacross is, in effect, a short circuit and a very high current will flow through the resistor 31 and one of the primaries 36 or 37. The currents flowing in these primaries induce a voltage in the secondary 38 which is rectified by the rectifier 40 to energize the relay 43 and open its normally closed contacts. Such opening of the relay 43 obviously will close down the operation of the entire apparatus described.

Obviously, the relay 13, 16 and the field coil 19 will be connected to other control and energizing circuits such as are conventional in the art and are not otherwise shown in the drawings.

It will be noted that, in effect, the spark gaps 30 are connected in electrical series between the wires 14 and 15. In addition, the mid connection between the spark gaps 30 is connected to the frame 18 of the alternator 11. In this way, it is primarily the voltage which will exist between the wire 14 or the wire 15 and the frame 18 of the alternator 11 which will control the break down of the particular spark gap 30. Ordinarily, relatively high voltages between the wires 14 and 15 are not as damaging or as dangerous as high voltages existing between one of the wires 14 or 15 and the frame 18. It is in this region that the insulation in the alternator 11 is the most critical.

It will be noted that each spark gap 30 is connected in series with one of the primary windings 36 or 37 of the current transformer 35. Thus, if either spark gap 30 breaks down, a voltage will be produced in the secondary 38 to actuate the relay 43.

Also, it will be noted that the primaries 36 and 37 each have a different number of turns. While the number of turns in each primary coil is relatively unimportant, it is desirable that the primaries have different number of turns. Thus, if both gaps 30 should break down simultaneously, the possibility of having the current in one primary coil in phase cancelling relationship to the currents in the other primary coil can be avoided.

It is, of course, possible to provide both primaries with the same number of turns and then to so properly connect the windings so that they will never be in current-bucking relationship. However, in safety apparatus of the type to which this invention pertains it is always desirable that the apparatus be made as fool-proof as possible and so that no mistake on the part of the person wiring the apparatus can result in the control apparatus being inoperative. The provision of a different number of turns on each of the primaries accomplishes this. With the arrangement shown, the connections to the primaries are relatively unimportant.

The current transformer 35 is also of an iron-core type having a cross-sectional area able to carry flux in relatively low values only without saturating.

Normally, the voltage developed across the secondary 38 would be proportional to the currents flowing in the primary windings. As extremely high currents can be developed through the spark gaps, it will be appreciated that extremely high voltages could be produced across the secondary 38 which might damage the rectifiers 40 so that they would be inoperative on subsequent overloads of the alternator 11. This damage would occur and would not be apparent to the operator of the apparatus. However, with a current transformer having a core with a relatively small cross-sectional area, currents above a predetermined value in the primaries 36 or 37 will simply saturate the core with flux and will not produce increased voltages across the secondary 38. In effect, the transformer serves as a safety valve permitting the control operation to take place when necessary but preventing damages to the control apparatus in the process of removing overloads from the alternator 11. The spark gaps are destroyed and must be replaced.

The primaries 36 and 37 are generally, as shown, one and two-turn primaries respectively. They do not have any appreciable inductance to limit the short-circuit current in the alternator output windings when the spark gaps 30 break down. This limiting of the short-circuit current is done either by the "Thyrite" resistors 31 in conjunction with the internal inductance and resistance of the alternator. It would normally be assumed that the placing of a short circuit such as would be the case when the spark gaps 30 broke down directly across the alternator 11 would cause disruptive currents to flow therein. Tests have shown that this is not the case. Normally, the reactance of the inductance 20 at the frequency of the alternator is such as to provide an impedance to the short-circuit current and limit the short-circuit current to values which are not damaging to the alternator until the generator can be turned off.

It will be appreciated that other types of alternating-current power sources can be employed with the invention. It is generally essential, however, that such power sources have sufficient inductance to provide a reactance at the operating frequency sufficient to limit the short-circuit current to values which will not damage the power source during the brief interval required to de-energize the field coils of the generator or remove the condensers from the load circuit. Short-circuit currents require brief time intervals to cause damage. If the power source does not have such internal inductance, it will be appreciated that an external inductance could be provided in series with the output terminals of the alternator or in series with the spark gaps 30, electronic tubes or the like. The spark gaps shown are relatively cheap and have been found to be quite effective.

It will thus be seen that an embodiment of the invention has been described which accomplishes all of the objectives heretofore set forth and others and provides apparatus which can very quickly remove high voltages from an alternating-current power source and, thereafter, de-energize the power source and remove the cause of the high voltages.

Obviously, modifications and alternations will occur to others upon a reading and understanding of this specification and it is our intention to include all such modifications and alternations insofar as they come within the scope of the appended claims.

Having thus described our invention, we claim:

1. In a high-frequency alternating-current power system including a high-frequency alternating-current power source having a frame and an output coil normally electrically independent of said frame having an inherent inductance, said system also including a load circuit comprised of lumped inductance and a lumped capacitance, the improvement which comprises means for preventing damage from resonant conditions between said load circuit and said inductance of said output coil, said means comprising spark gaps connected from each terminal of the output coil to the frame in a low impedance circuit including a current transformer having a primary connected in series with each spark gap and a secondary connected to means for de-energizing said power source.

2. In a high-frequency alternating-current power system including a high-frequency alternating-current power source having a frame and an output coil normally electrically independent of said frame having an inherent inductance, said system also including a load circuit comprised of lumped inductance and a lumped capacitance, the improvement which comprises means for preventing damage from resonant conditions between said load circuit and said inductance of said output coil, said means comprising a spark gap connected between each output terminal of said power source and said frame, a current transformer having a plurality of primaries one in series with each of said spark gaps and a secondary connected to means for de-energizing said power source.

3. In a high-frequency alternating-current power system including a high-frequency alternating current power source having a frame and an output coil normally electrically independent of said frame having an inherent inductance, said system also including a load circuit comprised of lumped inductance and a lumped capacitance, the improvement which comprises means for preventing damage from resonant conditions between said load circuit and said inductance of said output coil, said means comprising a spark gap connected from each output terminal of said output coil and said frame and a current transformer having a plurality of primaries one in series with each of said spark gaps, each primary coil having a different number of turns from the other primary coils, said current transformer also having a secondary connected to means for de-energizing said power source when said spark gaps fire, said current transformer having a core with a cross-sectional area which will saturate at flux densities below the maximum flux produced in such transformer.

4. In a high-frequency alternating-current power system including a high-frequency alternating-current power source having a frame and an output coil normally electrically independent of said frame having an inherent inductance, said system also including a load circuit comprised of lumped inductance and a lumped capacitance, the improvement which comprises means for preventing damage from resonant conditions between said load circuit and said inductance of said output coil, said means comprising a spark gap connected between each terminal of said output coil and said frame, a current transformer having a primary in series with said spark gap, said current transformer having an iron core with a cross-sectional area which will saturate at flux densities below the maximum flux produced in such transformer.

References Cited in the file of this patent
UNITED STATES PATENTS

| | | |
|---|---|---|
| 656,680 | Thomson | Aug. 28, 1900 |
| 729,236 | Steinmetz | May 26, 1903 |
| 1,200,796 | Arnold | Oct. 10, 1916 |
| 1,772,508 | Bascom | Aug. 12, 1930 |
| 2,200,085 | Hildebrand | May 7, 1940 |
| 2,246,324 | Schrader | June 17, 1941 |
| 2,386,458 | Haug | Oct. 9, 1945 |
| 2,456,986 | Paluev | Dec. 21, 1948 |
| 2,538,177 | Vigren | Jan. 16, 1951 |
| 2,569,133 | Podolsky | Sept. 25, 1951 |
| 2,664,526 | Diebold | Dec. 29, 1953 |
| 2,743,395 | Marbury | Apr. 24, 1956 |